US012794079B2

(12) United States Patent
Yao et al.

(10) Patent No.: US 12,794,079 B2
(45) Date of Patent: Nov. 10, 2026

(54) COMPOSITION, COMPOSITE SEPARATOR AND PREPARATION METHOD THEREFOR, AND LITHIUM ION BATTERY

(71) Applicant: SHENZHEN SENIOR TECHNOLOGY MATERIAL CO., LTD., Shenzhen (CN)

(72) Inventors: Yongqiang Yao, Shenzhen (CN); Xiang Ping, Shenzhen (CN); Liuhao Zhang, Shenzhen (CN); Jinguang Wang, Shenzhen (CN); Lujing Lin, Shenzhen (CN)

(73) Assignee: SHENZHEN SENIOR TECHNOLOGY MATERIAL CO., LTD., Guangdong (CN)

( * ) Notice: Subject to any disclaimer, the term of this patent is extended or adjusted under 35 U.S.C. 154(b) by 796 days.

(21) Appl. No.: 17/905,206

(22) PCT Filed: Apr. 17, 2020

(86) PCT No.: PCT/CN2020/085324
§ 371 (c)(1),
(2) Date: Aug. 29, 2022

(87) PCT Pub. No.: WO2021/208071
PCT Pub. Date: Oct. 21, 2021

(65) Prior Publication Data

US 2023/0120595 A1 Apr. 20, 2023

(51) Int. Cl.
*H01M 50/446* (2021.01)
*H01M 10/0525* (2010.01)
(Continued)

(52) U.S. Cl.
CPC ....... *H01M 50/446* (2021.01); *H01M 50/403* (2021.01); *H01M 50/489* (2021.01);
(Continued)

(58) Field of Classification Search
CPC ................................................ H01M 10/0525
See application file for complete search history.

(56) References Cited

U.S. PATENT DOCUMENTS

2006/0001487 A1 1/2006 Petrovic et al.
2009/0111026 A1 * 4/2009 Kim .................. H01M 50/451 429/252
(Continued)

FOREIGN PATENT DOCUMENTS

CN 107123767 A 9/2017
CN 108807825 A 11/2018
(Continued)

OTHER PUBLICATIONS

International Search Report and Written Opinion of PCT/CN2020085324, mailed Jan. 15, 2021, 9 pages. (submitted with copy of original document and English translation of the International Search Report).
(Continued)

*Primary Examiner* — Matthew W Van Oudenaren
(74) *Attorney, Agent, or Firm* — Heslin Rothenberg Farley & Mesiti P.C.; George S. Blasiak, Esq.

(57) ABSTRACT

Disclosed are a composition, a composite separator and a preparation method therefor, and a lithium ion battery. The composition includes 10-100 parts of a polymer resin, 0.5-10 parts of a polymer adhesive, 0-50 parts of an inorganic nanoparticle powder, and 0-40 parts of nanowires. The polymer resin includes a low melting point polymer and a high melting point polymer, wherein the low melting point polymer and the high melting point polymer are the same substance; the weight ratio of the low melting point polymer to the high melting point polymer is (5-90):(10-95), the melting point of the low melting point polymer is 145° C. or
(Continued)

less, and the melting point of the high melting point polymer is in the range of 146-500° C.

18 Claims, 1 Drawing Sheet

(51) Int. Cl.
*H01M 50/403* (2021.01)
*H01M 50/431* (2021.01)
*H01M 50/44* (2021.01)
*H01M 50/489* (2021.01)

(52) U.S. Cl.
CPC ...... *H01M 10/0525* (2013.01); *H01M 50/431* (2021.01); *H01M 50/44* (2021.01)

(56) References Cited

U.S. PATENT DOCUMENTS

| | | | | |
|---|---|---|---|---|
| 2014/0057057 | A1* | 2/2014 | Terai | H01M 50/426 427/535 |
| 2015/0372275 | A1 | 12/2015 | Lee et al. | |
| 2016/0204407 | A1* | 7/2016 | Kai | H01M 10/0525 429/144 |

FOREIGN PATENT DOCUMENTS

| | | | |
|---|---|---|---|
| CN | 109473602 | A | 3/2019 |
| CN | 109935770 | A | 6/2019 |
| CN | 110729440 | A | 1/2020 |
| CN | 110739430 | A | 1/2020 |
| EP | 3627586 | * | 3/2020 |
| JP | 2017135111 | A | 8/2017 |
| JP | 2017208338 | A | 11/2017 |
| JP | 2022549092 | A | 11/2022 |
| WO | 2018212252 | A1 | 11/2018 |
| WO | 2020000164 | A1 | 1/2020 |
| WO | 2020042684 | A1 | 3/2020 |
| WO | 2020060886 | A1 | 3/2020 |

OTHER PUBLICATIONS

List of Foreign References and Their Translations, dated Aug. 25, 2025. 2 pages.
Japan Patent Office, Notice of Reasons for Refusal in corresponding JP Application 2022549092, dated Oct. 3, 2023. 8 pages (w/translation).
China National Intellectual Property Administration, The First Office Action in corresponding CN Application 202080000572.3, dated Feb. 28, 2023. 15 pages (w/translation).
List of Foreign References and Their Translation, Dated Feb. 20, 2026. 2 pages.
Ministry of Intellectual Property/Korean Intellectual Property Office, Decision on Registration in corresponding KR Application 10-2022-7028307, dated May 26, 2025. 6 pages (w/translation).
Japan Patent Office, Decision to Grant in corresponding JP Application 2022-549092, dated Feb. 16, 2024. 3 pages (w/translation).
China National Intellectual Property Administration, Second Office Action in corresponding CN Application 202080000572.3, dated Sep. 16, 2023. 16 pages (w/translation).
China National Intellectual Property Administration, Rejected Decision in corresponding CN Application 202080000572.3, dated Feb. 10, 2024. 17 pages (w/translation).
European Patent Office, Office Action in corresponding EP Application 20930738.8, dated Mar. 6, 2023. 8 pages.
European Patent Office, Office Action in corresponding EP Application 20930738.8, dated Oct. 8, 2024. 8 pages.
Fedelich, Nicolas: "Application Handbook Thermal Analysis of Polymers Selected Applications Thermal Analysis", Jan. 1, 2013 (Jan. 1, 2013), XP055608279, Retrieved from the Internet: https://www.mt.com/dam/LabDiv/guides-glen/ta-polymer/TA_Polymers_Selected_Apps_EN.pdf.

* cited by examiner

COMPOSITION, COMPOSITE SEPARATOR AND PREPARATION METHOD THEREFOR, AND LITHIUM ION BATTERY

CROSS REFERENCE TO RELATED APPLICATIONS

This application is a national stage filing under section 371 of International Application No. PCT/CN2020/085324 filed on Apr. 17, 2020 and published on Oct. 21, 2021 as WO2021/208071 A1. The entire contents of WO2021/208071 A1 are hereby incorporated herein by reference.

TECHNICAL FIELD

The present disclosure relates to the field of lithium ion battery, and in particular, to a composition, a composite separator, and a preparation method therefor, and a lithium ion battery.

BACKGROUND ART

In recent years, with the vigorous development of the 3C market and the electric vehicle market, lithium ion battery, as the most commonly used energy device, has become an indispensable item in life, and is also a mass-produced industrial product worldwide. As one of the important constituent parts of lithium ion battery, the separator plays the role of electronic insulation between the positive and negative electrodes and provides microporous channels for the migration of lithium ions, which is a key material to ensure the safety of the battery system and affect the performance of the battery.

At present, 3C products are becoming more and more delicate and compact, and the demand for high battery energy density is increasing day by day, and more electrode materials need to be accommodated in a small volume, so the thickness of the separator is getting thinner and thinner. The increase in the endurance mileage of electric vehicles will also require higher and higher battery energy density, resulting in the thickness of the separator to become thinner and thinner.

However, the trend of thinner and thinner lithium ion battery separator also brings some performance problems: the static electricity of the separator is too large, which leads to poor fit with the electrode sheet in the assembled battery or the separator melted and shrunk under a high temperature condition, so that contacting between the positive and negative electrodes causes the battery to short-circuit, resulting in the battery to have the risk of burning and exploding at high temperatures, and the mechanical property of the thin separator is poor, which leads to the degradation of the performance of lithium ion battery products. In addition, the currently commonly used polyolefin microporous membrane has poor adsorption to the electrolyte, which is not conducive to the conduction of lithium ions during the charging and discharging process.

SUMMARY

The purpose of the embodiments of the present disclosure is to provide a composition, a composite separator, and a preparation method therefor, and a lithium ion battery.

In a first aspect, the present disclosure provides a composition that can be used to prepare a composite separator;

in parts by weight, the composition comprises 10-100 parts of a polymer resin, 0.5-10 parts of a polymer adhesive, 0-50 parts of an inorganic nanoparticle powder and 0-40 parts of a nanowire, wherein the polymer resin comprises a low melting point polymer and a high melting point polymer, wherein the low melting point polymer and the high melting point polymer are the same substance; the weight ratio of the low melting point polymer to the high melting point polymer is (5-90):(10-95), a melting point of the low melting point polymer is below 145° C., and a melting point of the high melting point polymer is in the range of 146-500° C.

The high melting point polymer has a high molecular weight, and swelling degree thereof is lower than that of the low melting point polymer, but the interface adhesion force provided by the low melting point polymer is higher than that of the high melting point polymer. The combined use of the high and low melting point polymers can improve the interface adhesion force between the composite separator and the electrode sheet while reducing swelling, and can improve the heat resistance of the composite separator, thereby reducing the separation of the composite separator from the electrode sheet in the electrolyte, reducing the occurrence of the bulge phenomenon of the battery, and reducing the occurrence of problems such as battery short-circuit.

In a second aspect, the present disclosure provides a composite separator, the composite separator comprises: a base material; and the above composition, wherein the composition is coated and cured on the surface of the base material.

The composite separator has a strong interface adhesion force with the electrode sheet, is not prone to swelling, has a good heat resistance, and has a good mechanical property.

In a third aspect, the present disclosure provides a preparation method of the aforementioned composite separator, which comprises the steps of:

mixing uniformly the low melting point polymer, the high melting point polymer, the polymer adhesive and the long nanowires to obtain a first mixed solution;

mixing an organic solvent with the pore-forming agent to obtain a second mixed solution;

mixing uniformly the first mixed solution, the second mixed solution, the short nanowires and the inorganic nanoparticle powder to obtain a slurry; and coating and curing the slurry on the surface of the base material, wherein optionally, a nucleating agent is further added to the first mixed solution;

optionally, discontinuous coating is performed by micro-gravure coating method;

optionally, the organic solvent comprises any one of acetone, dimethylacetamide, dimethylformamide, chloroform, dichloromethane, dichloroethane, dimethyl sulfoxide or N-methylpyrrolidone.

The method adopts the phase inversion method to prepare the composite separator, which can obtain a porous membrane structure with uniform pore size and pores. The introduction of nanowires can reduce the loosely dispersed oversized porous structure in the cured coating, and turn it into a solid, dense and uniform macro-porous structure, which can effectively improve the mechanical strength of the composite separator. By adding long nanowires, short nanowires and inorganic nanoparticle powder step by step, the structure of the coating gradually changes from loose→semi-cross-linked dense→close packing, which greatly improves the thermal shrinkage resistance of the coating and the mechanical property of the coated membrane. Further, discontinuous coating is performed by using the pattern microgravure method, which can make the coating have a high specific surface area, so that the coating has good adsorption performance to the electrolyte, which is beneficial to the conduction of lithium ions during the charging and discharging process.

In a fourth aspect, the present disclosure provides a lithium ion battery, wherein the lithium ion battery comprises the above-mentioned composite separator. In this lithium ion battery, by providing the above-mentioned composite separator, the conductivity of lithium ion is improved, the mechanical performance is improved, and the bonding force with the positive and negative electrode sheets is improved.

BRIEF DESCRIPTION OF DRAWINGS

In order to illustrate the technical solutions of the embodiments of the present disclosure more clearly, the drawings need to be used in the embodiments will be briefly introduced below, it should be understood that the following drawings only show some embodiments of the present disclosure, and therefore should not be regarded as a limitation of the scope, and for those ordinarily skilled in the art, other relevant drawings can also be obtained in light of these drawings, without using any inventive efforts.

DETAILED DESCRIPTION OF EMBODIMENTS

Figure 1:
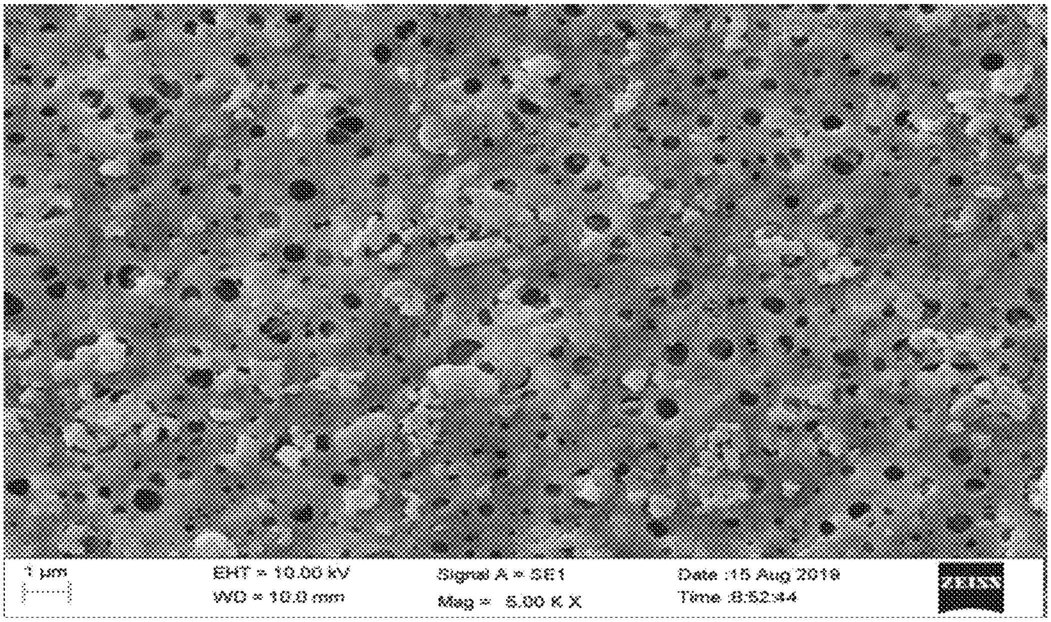
FIG. 1 is an electron microscope picture of a composite separator of the Example 1 in the present disclosure.

Embodiments of the present disclosure provide a composite separator, wherein the composite separator can reduce the separation of the composite separator from the electrode sheet in the electrolyte, reduce the occurrence of the bulge phenomenon of the battery, and reduce the occurrence of problems such as battery short-circuit.

The composite separator includes: a base material and a composition. The composition is coated and cured on the surface of the base material.

In some embodiments of the present disclosure, in parts by weight, the composition comprises 10-100 parts of a polymer resin, 0.5-10 parts of a polymer adhesive, 0-50 parts of an inorganic nanoparticle powder and 0-40 parts of a nanowire; the polymer resin comprises a low melting point polymer and a high melting point polymer, wherein the low melting point polymer and the high melting point polymer are the same substance; the weight ratio of the low melting point polymer to the high melting point polymer is (5-90):(10-95), a melting point of the low melting point polymer is below 145° C., and a melting point of the high melting point polymer is in the range of 146-500° C.

The low melting point polymer is used as the first adhesion agent, the high melting point polymer is used as the second adhesion agent, and the polymer adhesive is used as the third adhesion agent, the first adhesion agent ensures the adhesion force in the coating layer, and the second adhesion agent ensures the stability of the coating layer at high temperature, while the third adhesion agent acts as an auxiliary adhesion, which can achieve the effect of 1+1+1>3. Compared with one or two types of adhesion agents, the adhesion effect of three types of adhesion agents is better, and simultaneously, the coating layer maintains a good coating result under the high temperature condition of the battery, and has a wider application range.

Further, the polymer resin comprises any one of polyvinylidene fluoride, polyvinylidene fluoride-hexafluoropropylene copolymer, polyvinylidene fluoride-dichloroethylene copolymer, polyvinylidene fluoride-chlorotrifluoroethylene copolymer, polyvinylidene fluoride-tetrafluoroethylene copolymer, polystyrene, poly-n-butyl acrylate, polymethyl methacrylate, polyethyl methacrylate, poly-tert-butyl acrylate, polyacrylonitrile, polyvinyl acetate, acrylamide or polymethyl acrylate.

Further, the selection of the same material for the high and low melting point polymer resins is conducive to reducing the cumbersomeness in the use process, and is conducive to the large-scale production, procurement and post-processing of products. Further, the same polymer resin has high melting point and low melting point polymers due to different molecular weight, molecular structure and crystallinity.

Further, the polymer resin includes a low melting point polymer and a high melting point polymer, wherein the high melting point polymer has a high molecular weight, and swelling degree thereof is lower than that of the low melting point polymer, but the interface adhesion force provided by the low melting point polymer is higher than that of the high melting point polymer, and the combined use of high and low melting point polymers can ensure the interface adhesion force between the coating and the electrode sheet and the heat resistance of the coating to achieve better effect while reducing swelling.

Further optionally, the weight ratio of the low melting point polymer to the high melting point polymer is (10-80):(15-90).

Exemplarily, the weight ratio of low melting point polymer to high melting point polymer is 44:56 or 16:84.

Further, the melting point of the low melting point polymer is within the range of 100-145° C.; and the high melting point polymer has a melting point within the range of 146-200° C.

Exemplarily, the low melting point polymer has a melting point of 130° C. and the high melting point polymer has a melting point of 180° C.; or the low melting point polymer has a melting point of 135° C. and the high melting point polymer has a melting point of 175° C.

Further, in parts by weight, the composition includes 0.1-10 parts of a nucleating agent.

By adding the nucleating agent, the crystallinity of the polymer resin can be further improved to reduce the swelling, cooperating with the high and low melting point polymers to play a synergistic role, which further reduces the swelling of the polymer coating in the electrolyte, and reduces the conditions such as the separator displacement, deformation and battery bulge caused by expansion in the electrolyte, thereby reducing the separation of the coating from the electrode sheet in the electrolyte, reducing the occurrence of the bulge phenomenon of the battery, and reducing the occurrence of problems such as battery short-circuit.

Further, the nucleating agent comprises at least one of benzoic acid, adipic acid, sodium benzoate, calcium stearate, sodium p-phenol sulfonate, calcium p-phenol sulfonate, sodium phenate, boron nitride, sodium carbonate or potassium carbonate.

In some embodiments of the present disclosure, nanowire includes a long nanowire and a short nanowire.

Simultaneous use of long and short nanowires can make the coating layer tighter, and greatly improve the mechanical strength of the composite separator.

Further, the long nanowire has a length within the range of 30-150 μm, and the short nanowire has a length within the range of 0.1-29 μm.

In the composite separator, nanowires are added to the polymer, and the nanowire material with one-dimensional nanometer size has stronger mechanical property and thermal stability, and can effectively improve the mechanical property and thermal stability of the coating layer. Further, within the above range, the lengths of the two types of nanowires decrease progressively, the long nanowires play the role of the main skeleton, and the short nanowires play the role of the support, and the two cooperate with each other, so that the structure of the composition changes from loose to dense. Further, the inorganic nanoparticle powder is added to the polymer resin to play the role of filling the voids, further filling the voids between the long nanowires and the short nanowires, so that the structure of the composition becomes closely packed, thereby improving the thermal shrinkage resistance of the coating layer and the mechanical property of the coating membrane.

In some embodiments, the long nanowire and the short nanowire are each independently selected from one or more of carbon nanotubes, silver nanowires, boron carbide nanowires, nanocellulose, copper hydroxide nanowires, silicon monoxide nanowires or hydroxyapatite nanowires.

Further optionally, the aspect ratio of the nanowire is greater than 60, the diameter of the nanowire is 1-100 nm, and the length is 0.1-150 μm.

Further, the weight ratio of the long nanowire to the short nanowire is (80-95):(20-5).

Further optionally, the weight ratio of the long nanowire to the short nanowire is (81-94):(19-6). Further optionally, the weight ratio of the long nanowire to the short nanowire is (82-93):(18-7). Further optionally, the weight ratio of the long nanowire to the short nanowire is (85-90):(15-10).

Exemplarily, the weight ratio of the long nanowire to the short nanowire is 86:14, 94:6, or 64:36.

Further, the diameters of the long nanowire and the short nanowire are both in the range of 1-100 nm.

Further optionally, the diameters of the long nanowire and the short nanowire are both in the range of 10-100 nm.

Exemplarily, both the long nanowire and the short nanowire have diameters of 20 nm, 30 nm, or 50 nm.

Further, the length of the long nanowire is in the range of 35-145 μm, and the length of the short nanowire is in the range of 0.2-25 μm. Further optionally, the length of the long nanowire is in the range of 40-130 μm, and the length of the short nanowire is in the range of 0.5-20 μm. Further optionally, the length of the long nanowire is in the range of 50-100 μm, and the length of the short nanowire is in the range of 1-15 μm.

Exemplarily, the length of long nanowire is 50 μm and the length of short nanowire is 10 μm; or the length of long nanowire is 100 μm and the length of short nanowire is 20 μm; or the length of long nanowire is 120 μm and the length of short nanowire is 24 μm.

In some embodiments of the present disclosure, in parts by weight, the composition comprises 20-100 parts of a polymer resin, 1-10 parts of a nucleating agent, 1-10 parts of a polymer adhesive, and 0.1-50 parts of an inorganic nanoparticle powder and 0.1-40 parts of a nanowires.

Further, in parts by weight, the composition comprises 25-100 parts of a polymer resin, 1.5-9 parts of a nucleating agent, 1.5-9 parts of a polymer adhesive, 0.1-45 parts of an inorganic nanoparticle powder and 0.1-35 parts of a nanowires.

Further optionally, in parts by weight, the composition comprises 30-100 parts of a polymer resin, 2-8 parts of a nucleating agent, 2-8 parts of a polymer adhesive, 1-45 parts of an inorganic nanoparticle powder and 1-35 parts of a nanowires.

Further, the inorganic nanoparticle powder comprises at least one of aluminum hydroxide, aluminum oxide, silicon dioxide, barium titanate, magnesium oxide, boehmite, titanium oxide, calcium carbonate or zirconium dioxide.

Further, the polymer adhesive comprises at least one of styrene-butadiene latex, styrene-acrylic latex, polyvinyl acetate, polyvinyl alcohol, polyethyl acrylate, polybutyl methacrylate, ethylene-vinyl acetate copolymer or polyurethane.

In some embodiments, in parts by weight, the composition further includes 0.1-10 parts of a pore-forming agent, further optionally, 1-6 parts of a pore-forming agent.

By adding a pore-forming agent, a microphase separation structure can be induced to form a heat-resistant porous layer, thereby making the porous structure of the separator easier to be obtained.

In some embodiments of the present disclosure, the above-mentioned pore-forming agent can be selected from other solvents that are poor solvents relative to the above-mentioned polymer resin.

Further, the pore-forming agent is selected from at least one of pure water or polyol; pure water is preferred, and the formed coating layer will not release excessive impurities in the coagulation tank and the washing tank during the coagulation and washing process, reducing the difficulty of recycling wastewater in the coagulation tank and washing tank.

In some embodiments, in parts by weight, the composition further comprises 0.5-10 parts of a dispersant, the dispersant comprises at least one of carboxylate-type fluorine dispersant, triethyl phosphate, sulfonate-type fluorine dispersant, sodium polyacrylate, potassium polyacrylate or polyethylene glycol; further optionally, comprises 1-5 parts of a dispersant.

In some embodiments, in parts by weight, the composition further comprises 0.1-5 parts of an antistatic agent, and the antistatic agent comprises at least one of polythiophene, octadecyl dimethyl quaternary ammonium nitrate, trimethyl octadecyl ammonium acetate, N-hexadecyl pyridine nitrate, N-alkyl amino acid salt, betaine-type or imidazoline salt derivative; further optionally, comprises 0.5-2.5 parts of the antistatic agent.

By adding antistatic agent, the surface of the formed separator has less static electricity, which reduces the problem of uneven fit between the separator and the electrode sheet during the assembly process, and is easy to assemble the battery; and the anti-peeling ability of the separator and the bonding force with the positive and negative electrode sheets are higher, the hardness of the battery is improved, and the risk of short-circuit inside the battery is greatly reduced.

The composite lithium battery separator of the present disclosure has both a pore structure existing on the base material and a porous structure in the coating layer, and simultaneously, the pore-forming agent can better control the pore structure and increase the number of pores formed in the coating layer, thereby further improving the performance of the composite lithium battery separator.

Some embodiments of the present disclosure also provide a preparation method of the composite separator, which comprises:

- mixing uniformly the low melting point polymer, the high melting point polymer, the polymer adhesive and the long nanowires to obtain a first mixed solution;
- mixing an organic solvent with the pore-forming agent to obtain a second mixed solution;
- mixing uniformly the first mixed solution, the second mixed solution, the short nanowires and the inorganic nanoparticle powder to obtain a slurry; and
- coating and curing the slurry on the surface of the base material;

The method adopts the phase inversion method to prepare the composite separator, and can obtain a porous membrane structure with uniform pore size and pores. The addition of the pore-forming agent can induce a microphase separation structure, so that the coating forms a porous structure. The introduction of nanowires can reduce the loosely dispersed oversized porous structure in the coating, and turn it into a solid, dense and uniform macro-porous structure, which can effectively improve the mechanical strength of the composite separator. By gradually adding long nanowires, short nanowires and inorganic nanoparticle powder, the structure of the coating gradually changes from loose→semi-cross-linked dense→tight packing, which greatly improves the thermal shrinkage resistance of the coating layer and the mechanical property of the coated membrane. In some embodiments of the present disclosure, when the composite separator is prepared, in terms of weight percentage, 5%-50% of the composition and 50%-95% of the organic solvent are included.

Further, the organic solvent comprises any one of acetone, dimethylacetamide, dimethylformamide, chloroform, dichloromethane, dichloroethane, dimethyl sulfoxide or N-methylpyrrolidone.

In other optional embodiments of the present disclosure, the above-mentioned organic solvent may also select other polar solvents.

In some embodiments, a nucleating agent is also added to the first mixed solution. By adding the nucleating agent, the crystallinity of the polymer resin can be further improved and swelling can be reduced.

In some embodiments, when the above-mentioned slurry is coated, the slurry is coated to at least one surface of the base material by means of coating, and cured to form a coating layer.

Further optionally, discontinuous coating is performed by using pattern microgravure method, and coating coverage rate (30-95%) is adjusted by adjusting the engraved area on the roller surface, which can make the coating have a high specific surface area, so as to improve the adsorption performance of the coating to the electrolyte, thereby improving the conduction of lithium ions during the charging and discharging process.

Further, the step of mixing uniformly the first mixed solution, the second mixed solution, the short nanowires and the inorganic nanoparticle powder comprises:

- dividing the second mixed solution into a first part and a second part, first mixing the first part with the first mixed solution, the short nanowires and the inorganic nanoparticle powder, and then adding the second part,
- wherein the volume ratio of the first part and the second part is (6~8):(4~2).

By adding the second mixed solution in two parts, the pore structure in the coating can be further improved, so that there are larger pore diameters on the surface and the bottom of the coating.

Further optionally, the volume ratio of the first part to the second part is 7:3.

Further, the first mixed solution, the second mixed solution, the short nanowires and the inorganic nanoparticle powder are uniformly mixed, and then the dispersant and the antistatic agent are further added and mixed uniformly to obtain the slurry.

Further, the base material can be selected from polymer-based membrane, non-woven fabric or organic/inorganic composite membrane, wherein the polymer-based membrane can be polyethylene membrane, polypropylene membrane, polypropylene/polyethylene/polypropylene composite membrane, polyimide membrane, polyvinylidene fluoride membrane, etc.; the non-woven fabric can be polyethylene non-woven fabric, polypropylene non-woven fabric, polyimide non-woven fabric, etc.; the organic/inorganic composite membrane can be ceramic coating membrane, aramid coating membrane, polyvinyl fluoride coating membrane, etc.

The composite lithium battery separator prepared by using this method is of a multi-layered pore structure, and the densely packed inorganic particles and nanofibers provide the role of a support and a skeleton, so as to achieve the function of shaping, and simultaneously, reduce the risk of part of the polymer adhesive and dispersant being washed away by water during the washing process of the coating membrane, thereby ensuring that the separator has excellent low swelling property, high temperature resistance and mechanical property, reducing the probability of occurrence of short-circuit of the battery, and improving the hardness and shape retention ability of the cell.

In some embodiments, the preparation method of the composite separator comprises the following steps:

- S1: mixing and stirring the weighed low melting point polymer, high melting point polymer, polymer adhesive, nucleating agent and long nanowires uniformly to obtain a first mixed solution;
- S2: stirring the weighed organic solvent and the pore-forming agent uniformly to obtain a second mixed solution;
- S3: adding the second mixed solution, the short nanowires and the inorganic nanoparticle powder to the first mixed solution obtained in step S1 in sequence, and stirring the mixture uniformly to obtain a third mixed solution, wherein optionally, the second mixed solution is divided into a first part and a second part, and is added to the first mixed solution in two times, wherein according to the volume ratio, the first part: the second part is 7:3;
- S4: adding dispersant and antistatic agent to the third mixed solution obtained in step S3 in sequence, and stirring the mixture uniformly, and then filtering the mixture to obtain slurry, wherein optionally, dispersant is first added, and stirred for 10-20 min, and then antistatic agent is added, and stirred for 30-45 min;
- S5: coating the slurry on one side or two sides of the base material, and after coagulation, washing, drying and shaping, obtaining the composite separator.

The above-mentioned coating method includes one of dip coating method, microgravure coating method, pattern microgravure coating method, spray coating method, slope flow coating method or slit coating method, and the drying temperature is 40-100° C.

The pattern microgravure method is preferred for discontinuous coating, and the coating coverage rate (30-95%) can be adjusted by adjusting the engraved area on the roll surface, which can improve the coating to have a high specific surface area, so that the coating has a good adsorption performance to the electrolyte. It is beneficial to the conduction of lithium ions during charging and discharging process.

Some embodiments of the present disclosure also provide a lithium ion battery, the lithium ion battery includes the composite separator in the foregoing embodiments. In this lithium ion battery, by providing the above-mentioned composite separator, the lithium ion conductivity is improved, the mechanical performance is improved, and the bonding force with the positive and negative electrode sheets is improved.

The features and properties of the present disclosure will be described in detail below with reference to the examples and comparative examples.

Example 1

A composite separator was provided, and prepared according to the following steps:

① placing weighed 12 kg of polyvinylidene fluoride-hexafluoropropylene copolymer (according to the weight ratio, material with low melting point of 130° C.: material with high melting point of 153.5° C.=90:10), 1.5 kg styrene-butadiene latex, 0.3 kg sodium benzoate and 2.4 kg long nanowires (nanocellulose, 100 μm in length) into a large-capacity stirring tank and stirring at a rotating speed of 30 r/min for 20 min;

② placing weighed 69 kg of N-methylpyrrolidone and 1.0 kg of ultrapure water into a stirring tank, and stirring for 20 minutes at a rotating speed of 1000 r/min for dispersion and 20 r/min for stirring to obtain a mixed solution;

③ adding 49 kg of the mixed solution prepared in ② into the large-capacity stirring tank of ①, and stirring at a stirring speed of 35 r/min and a dispersion speed of 3000 r/min for 20 min; continuing to add 0.6 kg of short nanowires (nanocellulose, 20 μm in length), and stirring at 35 r/min stirring speed and 3000R dispersion speed for 20 min; continuing to add 13.5 kg of aluminum hydroxide powder (particle size of 0.8 μm), and stirring at 35 r/min stirring speed and 3500R dispersion speed for 30 min, finally, adding 21 kg of the mixed solution prepared in ②, and stirring at a stirring speed of 40 r/min and a dispersion speed of 3500 r/min for 20 min;

④ adding 1.0 kg of sodium polyacrylate into the stirring tank, stirring the slurry at a stirring speed of 30 r/min and a dispersion speed of 2500 r/min for 10 min, then adding 0.1 kg of polythiophene, and stirring at a stirring speed of 18 r/min and a dispersion speed of 600 r/min for 30 min, after the slurry was evenly stirred, filtering the slurry with a 200-mesh nylon screen to obtain a slurry with a solid content of 30% and a viscosity of 1000cp;

⑤ using the microgravure coating method (for the surface of the microgravure roller, the width of the engraved area: the width of the non-engraved area=800 μm: 500 μm) to coat the slurry on the PE base membrane with a thickness of 16 μm, and after solidification, washing, drying and shaping, obtaining a composite lithium ion battery separator, wherein the composite lithium ion battery separator had a thickness of 24.6 μm, and each side coating layer had a thickness of 4 μm.

Example 2

A composite separator was provided, and prepared according to the following steps:

① placing weighed 13.7 kg of polyvinylidene fluoride (according to the weight ratio, material with low melting point of 132.6° C.: material with high melting point of 166.3° C.=85:15), 0.3 kg polyvinyl acetate, 0.64 kg boron nitride and 1.8 kg long nanowires (boron carbide nanowires, 95 μm in length) into a large-capacity stirring tank and stirring at a rotating speed of 25 r/min for 20 min;

② placing weighed 78 kg of N-methylpyrrolidone and 6.0 kg of ultrapure water into a stirring tank, and stirring for 20 minutes at a rotating speed of 1500 r/min for dispersion and 15 r/min for stirring to obtain a mixed solution;

③ adding 58.8 kg of the mixed solution prepared in ② into the large-capacity stirring tank of ①, and stirring at a stirring speed of 30 r/min and a dispersion speed of 3000 r/min for 25 min; continuing to add 0.2 kg of short nanowires (boron carbide nanowires with a length of 20 μm), and stirring at a stirring speed of 35 r/min and a dispersion speed of 3000R for 20 min, finally, adding 25.2 kg of the mixed solution prepared in ②, and stirring at a stirring speed of 30 r/min and a dispersion speed of 3500 r/min for 30 min;

④ adding 0.5 kg of triethyl phosphate into the stirring tank, stirring the slurry at a stirring speed of 30 r/min and a dispersing speed of 2000 r/min for 15 min, then adding 0.5 kg of octadecyl dimethyl quaternary ammonium nitrate, stirring at a stirring speed of 18 r/min and a dispersion speed of 600 r/min for 30 min, after the slurry was evenly stirred, filtering the slurry with a 200-mesh nylon screen to obtain a slurry with a solid content of 16% and a viscosity of 410.5cp;

⑤ using the pattern microgravure coating method (for the surface of the microgravure roller, the width of the engraved area: the width of the non-engraved area=800 μm: 350 μm) to coat the slurry on a ceramic membrane with a thickness of 22 μm, and after solidification, washing, drying and shaping, obtaining a composite lithium ion battery separator, wherein the composite lithium ion battery separator had a thickness of 24.5 μm, and each side coating layer had a thickness of 1 μm.

Example 3

A composite separator was provided, and prepared according to the following steps:

① placing weighed 6.65 kg of polyvinylidene fluoride (according to the weight ratio, material with low melting point of 135° C.: material with high melting point of 170° C.=5:95), 0.15 kg polyethyl acrylate, 0.12 kg sodium carbonate and 1.0 kg long nanowires (hydroxyapatite nanowires, 90 μm in length) into a large-capacity stirring tank and stirring at a rotating speed of 35 r/min for 30 min;

② placing weighed 85 kg of dimethylacetamide and 7.0 kg of ultrapure water, into a stirring tank, and stirring for 25 min at a rotating speed of 1100 r/min for dispersion and 20 r/min for stirring to obtain a mixed solution;

③ adding 64.4 kg of the mixed solution prepared in ② into the large-capacity stirring tank of ①, and stirring at a stirring speed of 30 r/min and a dispersion speed of 3000 r/min for 20 min; continuing to add 0.2 kg of short nanowires (hydroxyapatite nanowires, 10 μm in length), and stirring at 35 r/min stirring speed and 3000R dispersion speed for 20 min, finally, adding 27.6 kg of the mixed solution prepared in ②, and stirring at a stirring speed of 40 r/min and a dispersion speed of 3500 r/min for 20 min;

⑤ adding 0.5 kg polyethylene glycol into the stirring tank, stirring the slurry at a stirring speed of 25 r/min and a dispersion speed of 2000 r/min for 20 min, then adding 0.6 kg of N-alkyl amino acid salt, and stirring for 30 min at a stirring speed of 20 r/min and a dispersion speed of 600 r/min, after the slurry was evenly stirred, filtering the slurry with a 200-mesh nylon screen to obtain a slurry with a solid content of 8% and a viscosity of 180cp;

⑤ using the pattern microgravure coating method (for the surface of the microgravure roller, the engraved area: the non-engraved area=600:600) to coat the slurry on the PP base membrane with a thickness of 14 μm, and after solidification, washing, drying and shaping, preparing a composite lithium ion battery separator, wherein the composite lithium ion battery separator had a thickness of 16.6 μm, and each side coating layer had a thickness of 1 μm.

Example 4

A composite separator was provided, and prepared according to the following steps:

① placing weighed 8.0 kg of polyvinylidene fluoride-dichloroethylene copolymer (according to weight ratio, material with low melting point of 129° C.: material with high melting point of 162.5° C.=60:40), 1.0 kg styrene-acrylic latex, 0.24 kg sodium p-phenol sulfonate and 1.8 kg long nanowires (carbon nanotubes, 75 μm in length) into a large-capacity stirring tank, and stirring at a rotating speed of 30 r/min for 20 min;

② placing weighed 78 kg of acetone and 2.0 kg of ultrapure water into a stirring tank, and stirring for 20 min at a rotating speed of 1000 r/min for dispersion and 20 r/min for stirring to obtain a mixed solution;

③ adding 56 kg of the mixed solution prepared in ② into the large-capacity stirring tank of ①, and stirring at a stirring speed of 35 r/min and a dispersion speed of 3000 r/min for 20 min; continuing to add 0.2 kg of short nanowires (carbon nanotubes, 5 μm in length), and stirring at 35 r/min stirring speed and 3000R dispersion speed for 20 min; continuing to add 9.0 kg aluminum oxide powder (particle size of 0.75 μm), and stirring at 35 r/min stirring speed and 3500R dispersion speed for 30 min, finally, adding 24 kg of the mixed solution prepared in ②, and stirring at a stirring speed of 40 r/min and a dispersion speed of 3500 r/min for 20 min;

④ adding 5 kg of carboxylate-type fluorine dispersant into the stirring tank, stirring the slurry for 10 min at a stirring speed of 30 r/min and a dispersion speed of 2500 r/min, and then adding 0.1 kg of N-hexadecyl pyridine nitrate, and stirring at a stirring speed of 18 r/min and a dispersion speed of 600 r/min for 30 min, after the slurry was evenly stirred, filtering the slurry with a 200-mesh nylon screen to obtain a slurry with a solid content of 20% and a viscosity of 630cp;

⑤ using the slit coating method to coat the slurry on the PP/PE/PP composite base membrane with a thickness of 16 μm, and after solidification, washing, drying and shaping, obtaining a composite lithium ion battery separator, wherein the composite lithium ion battery separator had a thickness of 20.7 μm, and each side coating layer had a thickness of 2 μm.

Example 5

A composite separator was provided, and prepared according to the following steps:

① placing weighed 9.8 kg of polyvinylidene fluoride-hexafluoropropylene copolymer (according to weight ratio, material with low melting point of 129° C.: material with high melting point of 162.5° C.=10:90), 0.2 kg polyvinyl alcohol, 0.3 kg calcium stearate into a large-capacity stirring tank, and stirring at a rotating speed of 35 r/min for 25 min;

② placing weighed 82 kg of NMP and 8.0 kg of ultrapure water into a stirring tank, and stirring for 20 min at a rotating speed of 1500 r/min for dispersion and 20 r/min for stirring to obtain a mixed solution;

③ adding 63 kg of the mixed solution prepared in ② into the large-capacity stirring tank of ①, and stirring at a stirring speed of 30 r/min and a dispersion speed of 3000 r/min for 30 min; continuing to add 27 kg of the mixed solution prepared in ②, and stirring at 30 r/min stirring speed and 3500 r/min dispersion speed for 30 min;

④ adding 0.5 kg potassium polyacrylate into the stirring tank, stirring the slurry at a stirring speed of 25 r/min and a dispersion speed of 2600 r/min for 15 min, then adding 0.5 kg trimethyl octadecyl ammonium acetate, and stirring at a stirring speed of 20 r/min and a dispersion speed of 800 r/min for 25 min, after the slurry was evenly stirred, filtering the slurry with a 200-mesh nylon screen to obtain a slurry with a solid content of 10% and a viscosity of 248.5cp;

⑤ using the pattern microgravure coating method (for the surface of the microgravure roller, the width of the engraved area: the width of the non-engraved area=900 μm: 300 μm), coating the slurry on a ceramic membrane with a thickness of 11 μm, and after solidification, washing, drying and shaping, obtaining a composite lithium ion battery separator, wherein the composite lithium ion battery separator had a thickness of 13.8 μm, and each side coating layer had a thickness of 1 μm.

Comparative Example 1

A composite separator was provided, and prepared according to the following steps:

① placing weighed 9.8 kg of polyvinylidene fluoride-hexafluoropropylene copolymer (high melting point of 153° C.) and 0.2 kg of polyvinyl alcohol into a large-capacity stirring tank, and stirring at a rotating speed of 35 r/min for 25 min;

② placing weighed 82 kg of NMP and 8.0 kg of ultrapure water into a stirring tank, and stirring for 20 min at a rotating speed of 1500 r/min for dispersion and 20 r/min for stirring to obtain a mixed solution;

③ adding 63 kg of the mixed solution to the large-capacity stirring tank of ①, and stirring at a stirring speed of 30 r/min and a dispersion speed of 3000 r/min for 30 min; continuing to add 27 kg of the mixed solution, and stirring at a stirring speed of 30 r/min and a dispersion speed of 3500 r/min for 30 min;

④ adding 0.5 kg of potassium polyacrylate into the stirring tank, stirring the slurry at a stirring speed of 25 r/min and a dispersion speed of 2600 r/min for 15 min, then adding 0.5 kg of trimethyl octadecyl ammonium acetate, and stirring at a stirring speed of 20 r/min and a dispersion speed of 800 r/min for 25 min, after the slurry was evenly stirred, filtering the slurry with a 200-mesh nylon screen to obtain a slurry with a solid content of 10% and a viscosity of 300.5cp;

⑤ using the pattern microgravure coating method (for the surface of the microgravure roller, the width of the engraved area: the width of the non-engraved area=900 μm: 300 μm), coating the slurry on a ceramic membrane with a thickness of 11 μm, and after solidification, washing, drying and shaping, obtaining a composite lithium ion battery separator, wherein the composite lithium ion battery separator had a thickness of 13.6 μm, and each side coating layer had a thickness of 1 μm.

Comparative Example 2

This comparative example provided a lithium ion battery separator, which was a polypropylene-based membrane with a thickness of 14.4 μm and a porosity of 47%, and was not subjected to any coating treatment.

Comparative Example 3

This comparative example provided a lithium ion battery separator coated with ceramic slurry (90% alumina particles+10% acrylate resin, wherein solvent is ultrapure water), the thickness of the separator is 22.3 μm, wherein the base membrane is a polyethylene base membrane with a thickness of 16 μm and a porosity of 51%; the traditional ceramic slurry was coated on both sides to form a coating, and the thickness of the coating on each side was 3 μm.

The products of the examples and comparative examples are tested below through experiments.

1. Electron microscope scanning was performed on the composite lithium ion battery separators of Example 1 and Example 3, and FIG. 1 is an electron microscope picture.

It can be seen from FIG. 1 that the composite lithium ion battery separator is of a porous structure and has a very high porosity. Therefore, the composite lithium ion battery separator of the present disclosure has high ionic conductivity and low swelling property.

Figure 2:
FIG. 2 is an electron microscope picture of discontinuous coating of the composite separator of Example 3 in the present disclosure.

It can be seen from FIG. 2 that the lithium ion battery separator prepared by discontinuous coating of the patterned microgravure has low resistance and high specific surface area, which greatly improves the infiltration efficiency of the electrolyte and the conduction efficiency of lithium ions.

2. The coating porosity, thermal shrinkage, interface adhesion force between the coating and the electrode sheet, tensile strength and elongation at break were tested for the composite lithium ion battery separators of Examples 1-5, the lithium ion battery separator of Comparative Example 1, and the lithium ion battery separator of Comparative Example 2, test methods thereof are as follows:

1. Thermal Shrinkage

① sample: taking 6 samples of 50 mm×50 mm uniformly in a width direction of the membrane roll;

② clamping the samples between parallel paper sheets, and placing flatly them on the stainless steel plate in the constant-temperature oven that reaches the specified temperature, wherein the stainless steel plate was located in the middle part of the constant-temperature oven;

③ taking them out after heating at a constant temperature of 150° C. for 0.5 h, after cooling to ambient temperature, measuring the longitudinal and transverse lengths, calculating the longitudinal and transverse thermal shrinkage rates separately according to the following formula, and taking the arithmetic mean value of 6 samples;

$$S=100\%*(L1-L2)/L1$$

where S—thermal shrinkage rate/%, L1—length before heating/mm; and L2—length after heating/mm.

2. Interface Adhesion Force

The test was carried out according to the provisions of GB/T 1040.3, 5 samples were taken from the product, wherein cut size was 1.5 cm*15 cm, the samples and the battery electrode sheet sample were completely overlapped together to be placed on a hot-pressing shaping machine for hot-pressing, wherein the parameters of hot-pressing shaping machine were set as follows: the temperature was 70° C., unit pressure was 4 Mpa, heat preservation time was 1 s, and hold pressure time was 1 s, wherein the electrode sheet is lithium cobaltate electrode sheet.

The CMT series microcomputer-controlled electronic universal (tensile force) testing machine was used for measurement, and the tensile speed was 300 mm/min, after the test was completed, the average value of the measured values of 5 samples was taken.

3. Tensile Strength and Elongation at Break

The test was carried out according to the provisions of GB/T 1040 [1]0.3-2006.

Five samples were taken from the product, wherein cutting width was 15 mm and the length was 150 mm (the test gauge length of the sample was 100 mm), after the test was completed, the average value of the measured values of the 5 samples was taken.

The data results of various tests are shown in the following table.

| Item | Unit | Example 1 | Example 2 | Example 3 | Example 4 | Example 5 | Comparative Example 1 | Comparative Example 2 | Comparative Example 3 |
|---|---|---|---|---|---|---|---|---|---|
| base membrane | | PE: 16 μm | PE + ceramic: 22 μm | PP: 14 μm | PP/PE/PP: 16 μm | PE + ceramic: 11 μm | PE + ceramic: 11 μm | PP: 14 μm | PE: 16 μm |

-continued

| Item | | Unit | Example 1 | Example 2 | Example 3 | Example 4 | Example 5 | Comparative Example 1 | Comparative Example 2 | Comparative Example 3 |
|---|---|---|---|---|---|---|---|---|---|---|
| coating film thickness | | μm | 24.6 | 24.5 | 16.6 | 20.7 | 13.8 | 13.6 | 14.4 | 22.3 |
| coating thickness | | | 8.6 | 2.5 | 2.6 | 4.7 | 2.7 | 2.6 | / | 6.3 |
| coating porosity | | % | 67.9 | 70.1 | 73.7 | 65.1 | 69.5 | 69.0 | 47.0 | 56.4 |
| thermal shrinkage (130° C./1 h) | MD | % | 2.5 | 1.3 | 4.5 | 4.0 | 1.0 | 1.0 | 7.5 | 3.0 |
| | TD | | 1.8 | 0.4 | 0.0 | 0.0 | 0.4 | 0.8 | 0.3 | 2.5 |
| thermal shrinkage (150° C./0.5 h) | MD | % | 4.8 | 2.5 | 5.7 | 5.2 | 1.4 | 1.5 | 35.0 | 5.0 |
| | TD | | 4.6 | 1.5 | 0.0 | 0.5 | 0.4 | 0.5 | 0.2 | 4.8 |
| bonding strength of coating and electrode sheet | | N/m | 50 | 20 | 15 | 40 | 15 | 8 | / | / |
| tensile strength | MD | Mpa | 201.0 | 160.3 | 185.6 | 180.5 | 153.4 | 150.2 | 178.8 | 154.2 |
| | TD | | 172.8 | 142.7 | 15.2 | 14.1 | 132.0 | 132.0 | 13.1 | 131.8 |
| elongation at break | MD | % | 167.9 | 125.2 | 126.2 | 130.1 | 108.8 | 105.5 | 125.6 | 120.8 |
| | TD | | 137.3 | 124.7 | 574.8 | 580.5 | 108.0 | 104.0 | 488.2 | 121.6 |

As can be seen from the above table, the composite lithium ion battery separator prepared according to the preparation method of the present disclosure has good thermal shrinkage performance and high adhesion force with the electrode sheet, which is significantly better than the uncoated separator and the separator coated by ceramic slurry in the comparative example.

Moreover, from the comparison between Examples 1, 2 and Comparative Example 3 (Examples 1, 2 and Comparative Example 3 are all PE base material separators prepared by wet method) and the comparison between Examples 3, 4 and Comparative Example 2 (Examples 3, 4 and Comparative Example 2 are all PP base material separators prepared by dry method), it can be seen that after adding nanowires to the coating, the thermal shrinkage, tensile strength and elongation at break are improved to varying degrees, indicating that nanofibers can significantly improve the thermal shrinkage and mechanical property of the coated membrane.

From the comparison between Example 5 and Comparative Example 1, it can be seen that after the combined use of high and low melting point polymers and the introduction of nucleating agent are performed in the coating, the interface adhesion force between the coating and the electrode sheet is increased by 75%, which can better reduce the bulge phenomenon, and improve cell safety.

The composite lithium ion battery separator of the present disclosure has a low swelling ratio, the introduced nanowires greatly improve the ionic conductivity of the separator, and the high temperature resistance and mechanical property of the separator, and the lithium ion battery separator prepared by discontinuous coating of pattern microgravure method not only has low resistance, but also has good gas permeability and high specific surface area, high lithium ion conduction efficiency and low swelling property of the separator. The preparation method of the composite lithium ion battery separator of the present disclosure is suitable for large-scale production, thereby improving practicability and economy thereof.

The above descriptions are only preferred embodiments of the present disclosure, and are not intended to limit the present disclosure, for those skilled in the art, the present disclosure may have various modifications and changes. Any modification, equivalent replacement, improvement, etc. made within the spirit and principle of the present disclosure shall be included within the protection scope of the present disclosure.

The invention claimed is:

1. A preparation method of a composite separator comprising a nanowire, the nanowire comprising a long nanowire and a short nanowire, and the method comprises steps of:

mixing uniformly a low melting point polymer, a high melting point polymer, a polymer adhesive and the long nanowire to obtain a first mixed solution;

mixing an organic solvent with a pore-forming agent to obtain a second mixed solution;

mixing uniformly the first mixed solution, the second mixed solution, the short nanowire and an inorganic nanoparticle powder to obtain a slurry; and coating and curing the slurry on a surface of a base material, wherein the composite separator comprises the base material and a composition coated and cured on the surface of the base material;

wherein in parts by weight, the composition comprises 10-100 parts of a polymer resin, 0.5-10 parts of the polymer adhesive, 0.1-50 parts of the inorganic nanoparticle powder and 0.1-40 parts of the nanowire, wherein the polymer resin comprises the low melting point polymer and the high melting point polymer; a weight ratio of the low melting point polymer to the high melting point polymer is (5-90):(10-95), a melting point of the low melting point polymer is not higher than 145° C., and a melting point of the high melting point polymer is in a range of 146-500° C.; and the long nanowire has a length within a range of 30-150 μm, and the short nanowire has a length within a range of 0.1-29 μm.

2. The preparation method of the composite separator according to claim 1, wherein the step of mixing uniformly the first mixed solution, the second mixed solution, the short nanowire and the inorganic nanoparticle powder comprises:

dividing the second mixed solution into a first part and a second part, first mixing the first part with the first mixed solution, the short nanowire and the inorganic nanoparticle powder, and then adding the second part, wherein a volume ratio of the first part and the second part is (6~8):(4~2).

3. The preparation method of the composite separator according to claim 1, wherein the first mixed solution, the second mixed solution, the short nanowire and the inorganic nanoparticle powder are uniformly mixed, and then a dispersant and an antistatic agent are further added and mixed uniformly to obtain the slurry.

4. The preparation method of the composite separator according to claim 1, wherein the melting point of the low melting point polymer is in a range of 100-145° C.; and the melting point of the high melting point polymer is in a range of 146-200° C.

5. The preparation method of the composite separator according to claim 1, wherein the long nanowire has a length within a range of 35-145 μm, and the short nanowire has a length within a range of 0.2-25 μm.

6. The preparation method of the composite separator according to claim 1, wherein in parts by weight, the composition comprises 0.1-10 parts of a nucleating agent.

7. The preparation method of the composite separator according to claim 1, wherein in parts by weight, the composition further comprises 0.5-10 parts of a dispersant, the dispersant comprises at least one of carboxylate-type fluorine dispersant, triethyl phosphate, sulfonate-type fluorine dispersant, sodium polyacrylate, potassium polyacrylate or polyethylene glycol.

8. The preparation method of the composite separator according to claim 1, wherein the coating is performed by a microgravure coating method.

9. The preparation method of the composite separator according to claim 1, wherein the organic solvent comprises any one of acetone, dimethylacetamide, dimethylformamide, chloroform, dichloromethane, dichloroethane, dimethyl sulfoxide or N-methylpyrrolidone.

10. The preparation method of the composite separator according to claim 1, wherein the polymer resin comprises any one of polyvinylidene fluoride, polyvinylidene fluoride-hexafluoropropylene copolymer, polyvinylidene fluoride-dichloroethylene copolymer, polyvinylidene fluoride-chlorotrifluoroethylene copolymer, polyvinylidene fluoride-tetrafluoroethylene copolymer, polystyrene, poly-n-butyl acrylate, polymethyl methacrylate, polyethyl methacrylate, poly-tert-butyl acrylate, polyacrylonitrile, polyvinyl acetate, acrylamide or polymethyl acrylate.

11. The preparation method of the composite separator according to claim 5, wherein a weight ratio of the long nanowire to the short nanowire is (80-95):(20-5).

12. The preparation method of the composite separator according to claim 5, wherein the long nanowire and the short nanowire both have a diameter within a range of 1 to 100 nm.

13. The preparation method of the composite separator according to claim 5, wherein the long nanowire and the short nanowire are each independently selected from one or more of carbon nanotubes, silver nanowires, boron carbide nanowires, nanocellulose, copper hydroxide nanowires, silicon monoxide nanowires or hydroxyapatite nanowires.

14. The preparation method of the composite separator according to claim 6, wherein the nucleating agent comprises at least one of benzoic acid, adipic acid, sodium benzoate, calcium stearate, sodium p-phenol sulfonate, calcium p-phenol sulfonate, sodium phenate, boron nitride, sodium carbonate or potassium carbonate.

15. The preparation method of the composite separator according to claim 1, wherein the inorganic nanoparticle powder comprises at least one of aluminum hydroxide, aluminum oxide, silicon dioxide, barium titanate, magnesium oxide, boehmite, titanium oxide, calcium carbonate or zirconium dioxide.

16. The preparation method of the composite separator according to claim 1, wherein the polymer adhesive comprises at least one of styrene-butadiene latex, styrene-acrylic latex, polyvinyl acetate, polyvinyl alcohol, polyethyl acrylate, polybutyl methacrylate, ethylene-vinyl acetate copolymer or polyurethane.

17. The preparation method of the composite separator according to claim 7, wherein in parts by weight, the composition further comprises 0.1-5 parts of an antistatic agent, and the antistatic agent comprises at least one of polythiophene, octadecyl dimethyl quaternary ammonium nitrate, trimethyl octadecyl ammonium acetate, N-hexadecyl pyridine nitrate, N-alkyl amino acid salt, betaine-type or imidazoline salt derivative.

18. The preparation method of the composite separator according to claim 7, wherein in parts by weight, the composition further comprises 0.1-10 parts of a pore-forming agent, and the pore-forming agent comprises at least one of pure water or polyol.

* * * * *